Nov. 17, 1936.   P. FREYSINGER ET AL   2,061,460
SAFETY SWITCH
Original Filed July 2, 1934
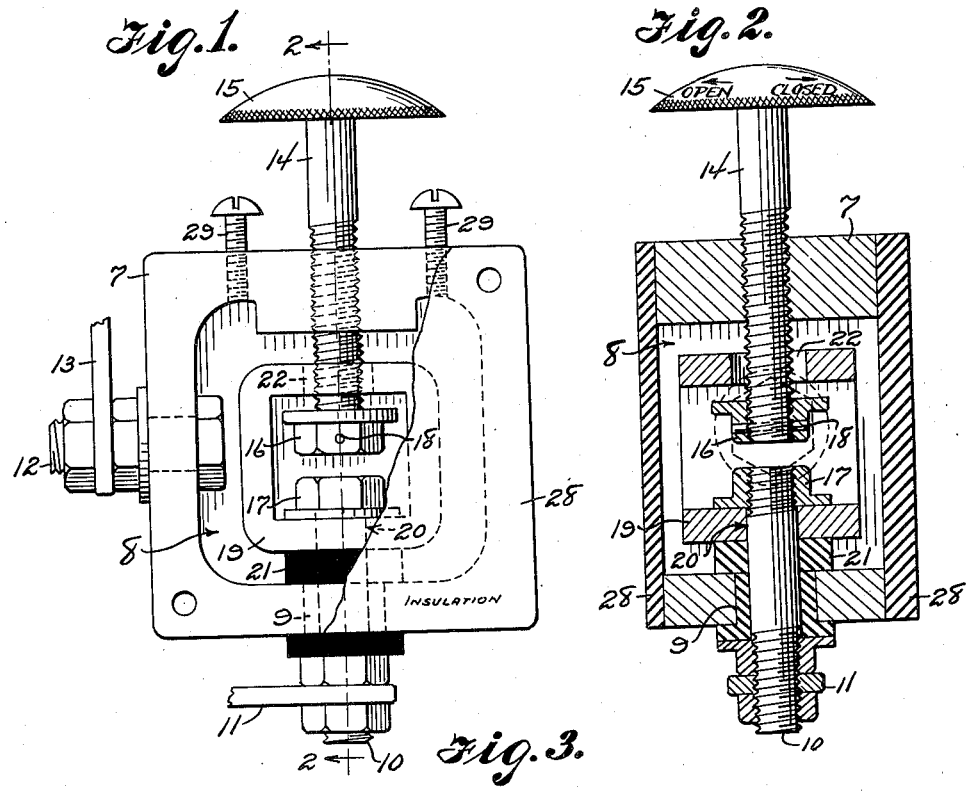
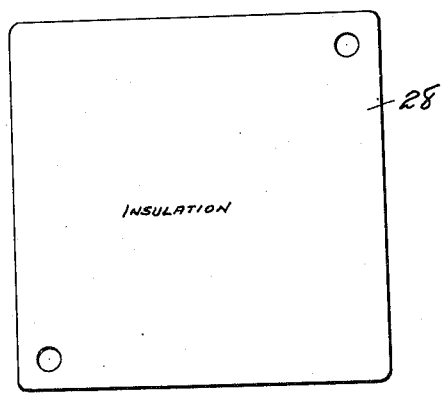
Paul Freysinger
Forrest L. Nesmith
INVENTORS.
BY Victor J. Evans & Co.
ATTORNEY Patented Nov. 17, 1936

2,061,460

UNITED STATES PATENT OFFICE 2,061,460

SAFETY SWITCH

Paul Freysinger and Forrest L. Nesmith, Lemoyne, Pa.

Application July 2, 1934, Serial No. 733,495
Renewed June 26, 1936

1 Claim. (Cl. 200—158)

The invention relates to an electric switch and more especially to a safety switch for installation in automobiles, airplanes or the like.

The primary object of the invention is the provision of a switch of this character, wherein the same can be installed in any suitable place within an automobile or other vehicle and is designed to open the electric system as equipped within said automobile, thereby avoiding the running down of a battery in event of failure to release the switches included in the electric system, for example, windshield wiper switch, stop light switch, ignition switch or the like, and also enables convenient replacing of a battery, or repairs at motor or the wiring of the electrical system, as short circuiting will be eliminated.

Another object of the invention is the provision of a switch of this character, wherein on installation within an electric system of an automobile conflagration will be reduced to a minimum should a pinched or shortage wire occur resultant from collision or otherwise, as the battery included in the electric system can be cut out and the electric current in the system shut off.

A further object of the invention is the provision of a switch of this character which is extremely simple in construction, thoroughly reliable and efficient in its operation, manually controlled, strong, durable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claim hereunto appended.

In the accompanying drawing:

Figure 1 is an elevation partly in section of a switch constructed in accordance with the invention.

Figure 2 is a sectional view on the line 2—2 of Figure 1 looking in the direction of the arrows.

Figure 3 is a plan view of a cover plate for the construction shown in Figures 1 and 2.

Similar reference characters indicate corresponding parts throughout the several views in the drawing.

Referring to the drawing in detail, particularly Figures 1 and 2, the switch comprises a metal frame 7 having the open center 8 which, at one point thereof, is fitted with an insulating bushing 9 for the terminal post 10 to which is connected the lead 11 from an electric storage battery (not shown), while at another point of this frame 7 is connected the terminal connector 12 for the ground lead 13 of an electric circuit as included in the electrical system equipped within the automobile or the like.

Arranged in alignment with the post 10 and threaded in the frame 7 is a turning switch stem 14 carrying exteriorly of said frame, at its outer end, a turning head 15, while at the inner end of this stem 14 is fitted a nut-like movable switch contact 16, the same being opposite a retaining nut 17 on the switch post 10, the retaining nut 17 on the switch being threaded on the said post. The contact 16 is threaded on the stem 14 and made secure by a cross anchoring pin 18. About the contact 16 is a box-like stationary switch contact 19 having the hole 20 for the post 10, the nut 17, when engaged upon the post 10 being adapted to secure the box-like contact 19 centered with respect to the frame 7 and this box-like contact being insulated from the frame 7 through the medium of an insulating block 21. This block surrounds the post 10 between the frame 7 and the contact 19. The box-like contact 19 is provided with clearance 22 for the stem 14, so that the latter is out of engagement therewith and the contact 16 is adapted to be brought into contact with the said contact 19 for the closing of the circuit through the switch, the stem 14, through the instrumentality of the turning head 15, being manually operated. This head 15 is preferably provided with suitable indicia indicative of the direction that the same should be turned for the opening or closing of the switch.

The box-like contact 19 serves to maintain the connections clean as had between the contacts 16 and 19.

It will be obvious that when the stem 14 raises the contact 16 it will engage the contact 19 and thus close the electric circuit. On the lowering of the contact 16, engagement is broken with the contact 19 and thus the circuit is opened.

It should be obvious that the stationary contact 19 is of loop or box-like formation and about the movable contact 16.

A cover plate 28 is provided for the frame 7, one being arranged at each side thereof and fastened in place in any suitable manner for their removal.

There are also provided fasteners 29 for the securing of the frame in place when in use.

What is claimed is:

In a switch of the kind described, spaced inner and outer four-walled frames open at opposite sides, removable closure plates for said open sides, a terminal connection with the inner frame and insulated from the outer frame for having the inner frame serve as a fixed contact, a terminal connection with the outer frame, a switch stem adjustably threaded in the outer frame and cleared from the inner frame, and a contact within the inner frame and movable with the stem for engaging the fixed contact formed by the inner frame to close an electric circuit between said terminals.

PAUL FREYSINGER.
FORREST L. NESMITH.